Sept. 24, 1940. W. B. BUCHANAN ET AL 2,215,541
TORSIONAL DAMPER FOR LINE CONDUCTORS
Filed May 6, 1936
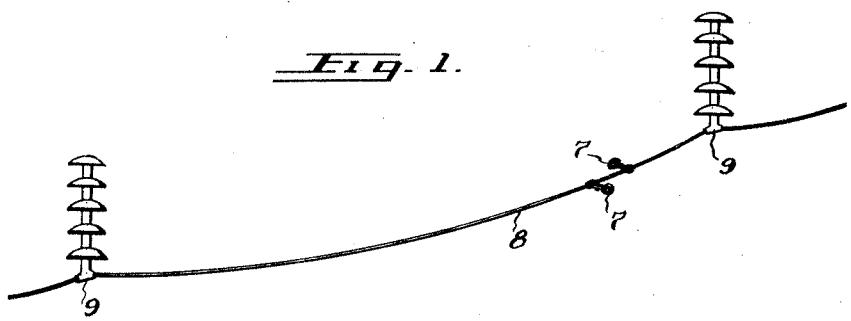
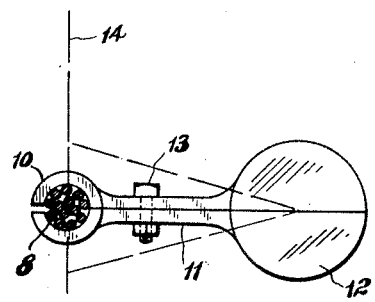
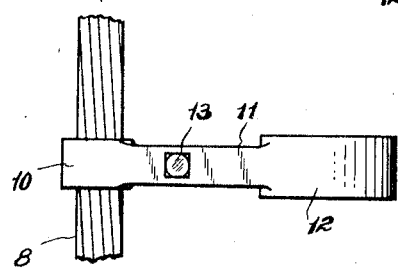
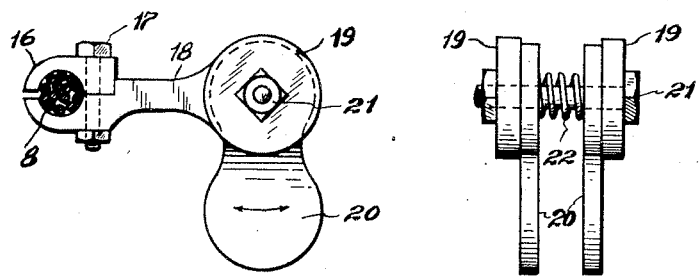
Inventors,
William B. Buchanan &
Gordon B. Jebo
By Frederick E. Bromley
Attorney Patented Sept. 24, 1940

2,215,541

UNITED STATES PATENT OFFICE 2,215,541

TORSIONAL DAMPER FOR LINE CONDUCTORS

William B. Buchanan and Gordon B. Tebo, Toronto, Ontario, Canada, assignors to General Cable Corporation, New York, N. Y., a corporation of New Jersey Application May 6, 1936, Serial No. 78,074

13 Claims. (Cl. 174—42)

The invention relates to improvements in means for damping standing or traveling mechanical wave on transmission lines as described in the present specification and shown in the accompanying drawing that forms part of the same.

Economic pressure in the design of modern transmission lines for transfer of electric energy has tended towards the construction of longer spans, larger sizes of conductors and higher mechanical tensions. These factors, however, singly and collectively have caused unforeseen troubles due to failure of conductors at the clamps. Such failures have been carefully studied and it is generally accepted that they are the result of fatigue of the metal and that vibrations caused by the wind tend to set up high concentration and reversals of stress at clamps and other points of reflection. From tests that have been made it would appear that the transient components of stress at such points of reflection may be ten to forty times the corresponding component at any free section in the span.

We are aware that for the purpose of mitigating hazards from such stresses various expedients have been tried and many attachments devised for eliminating vibrations. Some of the latter involve the utilization of mechanical friction and while, as an energy absorber, this is ideal, great difficulty has been experienced in constructing any simple, durable device solely on this principle which completely fills the requirements. Other devices proposed combine resonance means with frictional damping which give some useful results, but resonant schemes themselves introduce some tendency for various parts to fall into step as well as out of step and thus become a possible hazard under certain conditions of operation; hence their true value is difficult to determine over their complete operating range.

Analytical study verified by results of extensive tests that we have conducted indicate that if the high concentration of stress at points of reflection could be avoided and the loss of energy uniformly distributed over a length of conductor of say twenty feet or more, the conductor could quite readily absorb much more energy without damage.

It has been generally assumed that a friction loss occurs in a vibrating conductor between strands and between layers. Test results however indicate that at any moderate amplitude such loss is negligible because the normal stringing tension on the conductor results in such pressure between strands as to prevent relative motion until the static friction is overcome by excessive bending. Hence there is in any large size stranded conductor an available energy-absorbing medium of practically unlimited durability and the means of utilizing such medium is the object of this invention.

With this end in view, the invention broadly comprehends a weight or weights sustained on a line conductor in a substantially horizontal position radially thereof so that the mass or masses will constantly exert a restraining torque. This torque induces damping of waves by its effect on interstrand friction. To derive best results, weights are applied to opposite sides of the vertical plane through a conductor, the weights being offset in relation to each other. The forces thus act oppositely to each other at different points on the line conductor.

The invention more specifically proposes, by any suitable system of weights having their centres of gravity laterally eccentric with the axis of the conductor, to convert the energy of either travelling or standing waves on a line conductor into torsional or twisting oscillations which by reason of interstrand friction would be highly damped. For maximum effect certain proportions should exist between the mass of conductor and the weights and the mass of conductor and the disposition of the former laterally and longitudinally with the conductor.

As an example of the application of the invention, the following arrangement was tested: Two ten-pound weights with centres of gravity four inches from the conductor were mounted horizontally on opposite sides of the conductor and about eight feet apart longitudinally on the conductor. This conductor consisted of 795,000 c. m. A. C. S. R. cable sustained horizontally at a tension of 5000 pounds and the scheme was found to be quite effective. The example is given for illustration purposes only and is not intended to place any restrictions on the modifications or extensions that may be made while adhering to the fundamental principle stated above.

Tests indicate that protective measures based on this principle of absorption can be made very effective in minimizing damage due to galloping or dancing of conductors, and the latter phenomenon has become so prevalent as to give much concern to those responsible for maintenance of high tension transmission lines.

Referring to the accompanying drawing, Figure 1 is a schematic view showing a pair of weights applied to a span of a line conductor.

Figure 2 is a cross section of the line conductor and a side view of a weight attached thereto.

Figure 3 is a plan view of Figure 2.

Figure 4 is a similar view to Figure 2, but showing a slightly modified weight structure.

Figure 5 is an end view thereof.

Like numerals of reference indicate corresponding parts in each of the figures throughout the drawing of the invention.

In carrying out the preferred construction of the invention, a pair of weights 7 are attached to a span of a conductor 8 supported between the clamps 9, as shown in Figure 1. The weights extend outwardly from opposite sides of the conductor in substantially a horizontal plane, and are spaced apart longitudinally of the conductor. Each weight has its centre of gravity eccentric to the axis of the conductor in order to exert a twisting moment thereon, the combined moments producing a torsional force on the extent of the conductor between the weight members. This torsional force, through the interstrand friction, dissipates energy of waves set up in the conductor.

In Figures 1 and 2 a simple form of weight member is illustrated by way of example, but not of limitation. This consists of a sleeve 10 having an integral arm 11 carrying the weight proper 12. The weight proper is a mass of metal of sufficient bulk to exert the required torque on the line conductor. It is suggested that the weight member may be composed of two parts bolted together as at 13 in order to clamp rigidly on the conductor. It is positioned at right angles to the vertical, denoted by the line 14 in Figure 2, so that weight-mass may normally apply a twisting force about the axis of the cable. Due to inertia of the mass, this tends to remain stationary with the result that the waves of the line are prevailed upon to oscillate in an arc about the centre of gravity.

In the modification shown in Figures 4 and 5, a sleeve 16 is formed with a split clamp drawn together by a bolt 17 to rigidly attach it to the line conductor. The arm 18 has a bifurcated weight piece 19 in which depending weights 20 are suspended by a bolt 21 or equivalent means. A spring 22 encircles the bolt to urge the depending weights into frictional contact with the inner faces of the weight piece 19. The depending weights are disposed for movement in a plane transversely of the line conductor.

In operation, it will be gathered that the depending weights function to resist the tendency of the weight supporting member 19 to oscillate vertically with the line conductor and thus set up a force that dissipates wave energy and thereby effectively damps oscillatory motion.

The use of a pivotal coupling between the members 19 and 20 tends to reduce stresses at the point of attachment of the sleeve 16 on the line conductor, which would otherwise be imposed due to the moment of inertia of the weight 20.

It will be manifest that changes and modifications may be resorted to as coming within the spirit and scope of the invention as herein disclosed.

What we claim is:

1. The combination with a stranded line conductor of the class described, of weights rigidly secured to the conductor in spaced longitudinal relation between conductor supports at a point subject to vibration with their centres of gravity disposed in opposite lateral directions from the vertical plane containing the axis of the conductor, whereby vibrations of the conductor result in opposed varying torsional forces being applied to the conductor to thus convert the energy of conductor vibrations into interstrand frictional losses.

2. The combination with a stranded line conductor of the class described, of weighted arms rigidly suspended on the conductor radially of the axis thereof in opposite lateral directions, said arms being spaced from each other longitudinally along the conductor between conductor supports at a point subject to vibration, whereby wave energy communicated thereto is absorbed by the applied, opposing torsional forces producing interstrand friction.

3. The combination with a line conductor of the class described, of an arm rigidly mounted thereon in substantially horizontal transverse direction, means carried by the distal end of the arm to provide friction faces, depending weights pivotally supported thereby, and resilient means urging the weights into frictional contact with said faces so as to absorb wave energy imparted to the arm.

4. The combination with a line conductor of the class described, of a plurality of longitudinally spaced arms rigidly mounted on the conductor in substantially opposite transverse directions, means carried by the distal ends of the arms to provide friction faces in planes normal to the conductor axis, depending weights pivotally supported on said means and springs applying pressure thereon to retain the weights in frictional contact with the respective faces aforesaid.

5. The combination with a line conductor in a span of damper means comprising elements rigidly secured to the conductor at spaced points on the line conductor subject to vibration, and masses individually suspended by said elements, said masses being sufficiently large and having the centre of gravity of one mass located in an opposite lateral direction to the centre of gravity of another mass in respect of the axis of the line conductor, so as to produce opposing varying twisting forces on the conductor during vibration to thus convert the energy of conductor vibration into energy losses within the conductor.

6. A structure in accordance with claim 3, in which the means for resiliently urging the weights consist of a compression spring incorporated in the pivotal support of the depending weights.

7. The combination with a stranded line conductor, of an arm rigidly mounted on the conductor, and a weight carried by the arm and having its centre of gravity displaced from the vertical plane containing the axis of the conductor, whereby vibrations of the conductor result in varying torsional forces being applied to the conductor to thus convert the energy of conductor vibrations into interstrand frictional losses, said arm sustaining the weight by means of an articulated connection incorporating frictionally engaged faces, the axis of the articulated connection being disposed laterally of the vertical plane containing the axis of the conductor.

8. The combination with a line conductor of the class described, of an arm rigidly mounted thereon in substantially horizontal transverse direction, a weight carried by the arm and having its centre of gravity displaced from the vertical plane containing the axis of the conductor, and an articulated connection therefor by which circular movement of the weight is yieldingly constrained in a plane normal to the axis of the conductor.

9. The combination with a line conductor of the class described, of a plurality of longitudinally spaced arms rigidly mounted on the conductor in substantially opposite transverse directions, a weight carried by each arm and having its centre of gravity displaced from the vertical plane containing the axis of the conductor, and an articulated connection therefor by which circular movement of the weight is frictionally constrained in a plane normal to the axis of the conductor.

10. The combination with a line conductor of the class described, of an arm rigidly mounted thereon in substantially horizontal transverse direction, weights carried by the distal end of the arm, and an articulated connection attaching the weights to the arm to yieldingly constrain rotative movement of the weights about the axis in a plane normal to the axis of the conductor.

11. The combination with a flexible cable suspended at spaced points and subject to vibration, of vibration damping means including an arm rigidly mounted thereon at a distance from a support, and a weight mounted on said arm by an articulated joint to place its center of gravity at one side of the vertical axial plane of said cable, said joint including means frictionally constraining said weight against rotative movement with reference to said arm, said joint comprising an axis parallel to the longitudinal axis of the cable.

12. The combination with a flexible cable suspended at spaced points and subject to vibration, of vibration damping means including an arm mounted on the cable and a weight mounted on the arm with its center of gravity at one side of the vertical axial plane of the cable to place a continuing torsion on the cable, and an articulated joint between the arm and weight permitting movement about an axis parallel to the cable axis, said joint including means to apply torsional resistance to movement between said arm and said weight.

13. The combination with a flexible cable suspended at spaced points and subject to vibration, of vibration dampening means including an arm rigidly mounted on the cable at a distance from a support, a weight mounted on said arm with its center of gravity at one side of the vertical axial plane of the cable, an articulated joint connecting said weight and arm whereby said weight is capable of rotative movement relative to said arm about an axis parallel to the longitudinal axis of the cable, said joint including means yieldingly constraining said weight against said rotative movement.

WILLIAM B. BUCHANAN.
GORDON B. TEBO.